United States Patent [19]
Shattock

[11] 3,959,135
[45] May 25, 1976

[54] DEWATERING OF SLURRIES

[76] Inventor: Geoffrey Francis Shattock, 5, Orchard Close, Long Lane, Tilehurst, Reading, Berkshire, England

[22] Filed: Feb. 24, 1975

[21] Appl. No.: 552,723

Related U.S. Application Data

[63] Continuation of Ser. No. 396,681, Sept. 13, 1973, abandoned.

[52] U.S. Cl. ................................. 210/77; 71/21; 210/350; 210/400
[51] Int. Cl.² ..................................... B01D 33/02
[58] Field of Search .............. 71/21; 100/153, 154; 210/77, 350, 396, 400, 401

[56] References Cited
UNITED STATES PATENTS

| | | | |
|---|---|---|---|
| 881,186 | 3/1908 | Hulings et al. | 100/153 X |
| 2,043,371 | 6/1936 | Davis | 210/400 X |
| 2,906,402 | 9/1959 | Blankevoort | 210/400 |
| 3,440,949 | 4/1969 | Trussel | 210/400 X |
| 3,453,951 | 7/1969 | Malarkey, Jr. | 210/401 X |
| 3,704,788 | 12/1972 | Goodman et al. | 210/401 |
| 3,713,540 | 1/1973 | Davidson et al. | 210/77 X |
| 3,840,122 | 10/1974 | Myers | 210/400 |
| 3,873,450 | 3/1975 | Lovegreen | 210/400 X |

*Primary Examiner*—Charles N. Hart
*Assistant Examiner*—Robert G. Mukai
*Attorney, Agent, or Firm*—Christie, Parker & Hale

[57] ABSTRACT

Apparatus for dewatering agricultural effluent slurries comprises an endless belt dewatering screen of thin flexible inextensible material, and opposed pressure rollers to apply wringing pressure to the screen and slurry thereon. A rotary brush is provided to remove dewatered material from the screen and the slurry is aerated before entry on to the screen.

22 Claims, 12 Drawing Figures

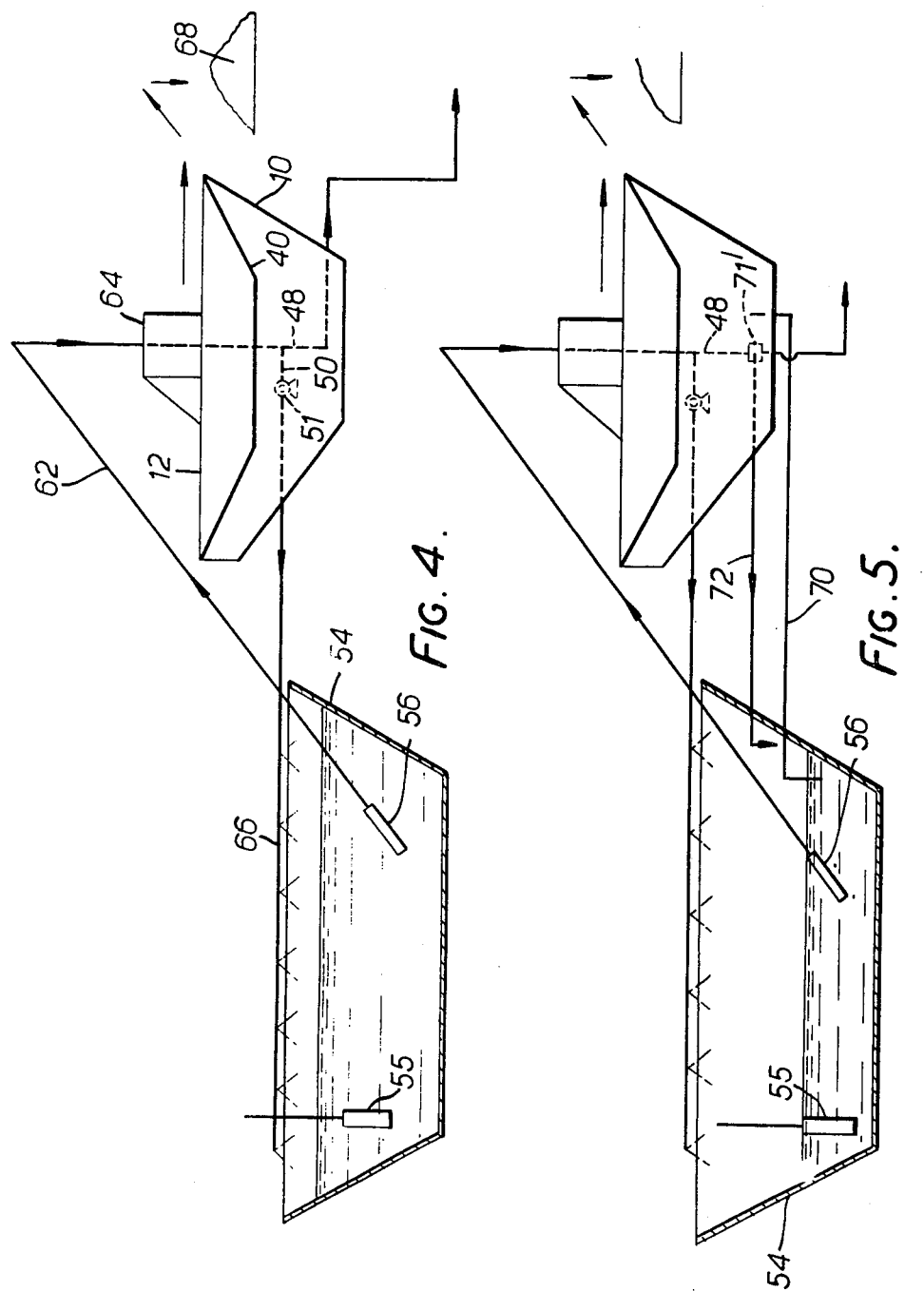

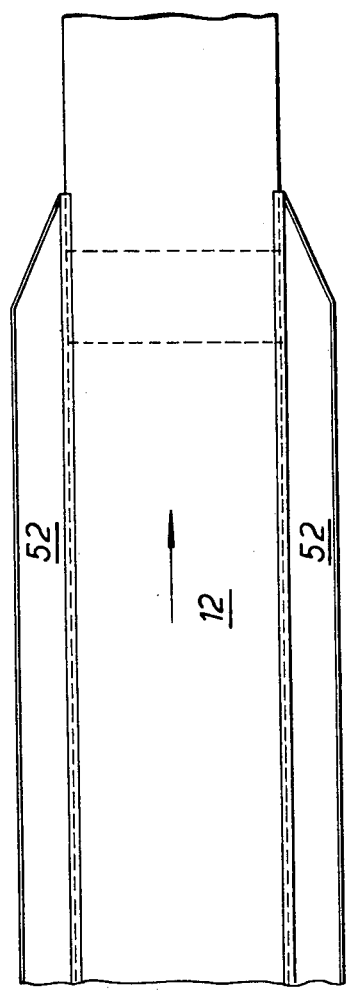
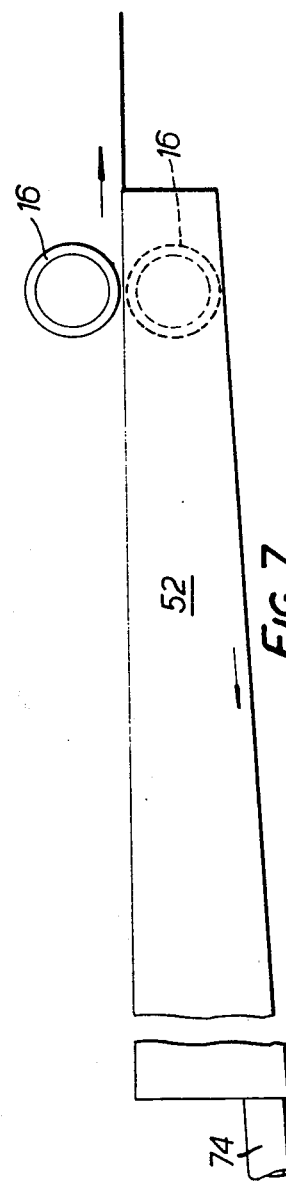
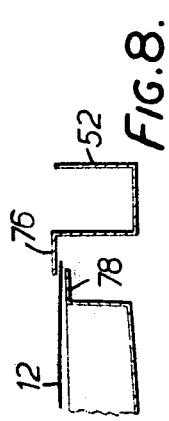

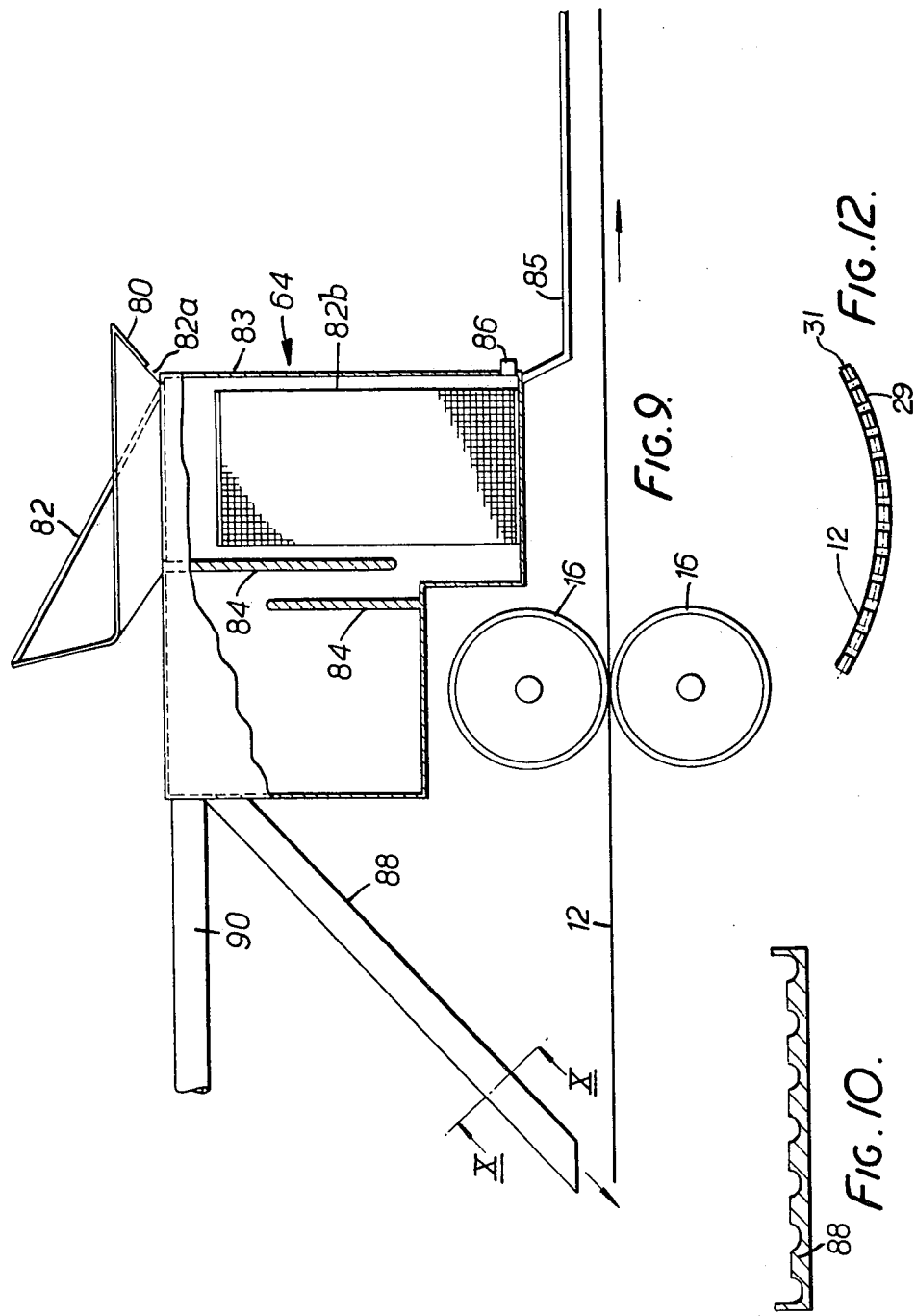

DEWATERING OF SLURRIES

This is a continuation of application Ser. No. 396,681, filed Sept. 13, 1973, and now abandoned.

This invention is concerned with improvements in or relating to dewatering of slurries.

Efficient dewatering of slurries at times presents a problem and this arises for example in the treatment for disposal of fibrous organic slurries in agriculture.

It is an object of the present invention to provide improved apparatus adapted for use in dewatering slurries.

The invention also comprehends method and product aspects.

The invention provides apparatus adapted for use in dewatering slurry comprising a dewatering screen of thin flexible wringable inextensible material, opposed rollers between which the screen passes, means for applying wringing pressure to the rollers thus applying wringing pressure to the screen and slurry thereon, and means for driving the rollers to move the screen past the rollers solely by pinch action of the rollers.

The preferred embodiment of the invention also provides apparatus adapted for use in dewatering slurry comprising a dewatering screen of thin flexible wringable inextensible material, a single pair of opposed rollers between which the screen passes, means for applying wringing pressure to the rollers thus applying wringing pressure to the screen and slurry thereon and means for driving the rollers to move the screen past the rollers solely by pinch action of the rollers.

Preferably, to remove dewatered material from the screen there is provided a rotary brush engageable with the screen.

The invention also provides a method of dewatering slurry comprising the steps of feeding slurry to be dewatered onto a screen of thin flexible wringable inextensible material passing between opposed rollers, applying wringing pressure to the screen and slurry thereon, and driving the rollers to move the screen past the rollers solely by pinch action of the rollers.

The invention also provides a method of dewatering slurry comprising the steps of feeding slurry to be dewatered onto a screen of thin flexible wringable inextensible material, applying wringing pressure to the screen and slurry thereon, and removing the dewatered material from the screen in a non self sustaining form.

The screen is for example of textile material, e.g. terylene, in a range from voile to net. Alternatively, for example, the screen is of metallic material, e.g. welded stainless steel mesh or Electro Foil which is a thin perforated metal foil with perforations understood to be produced by a photographic process. Examples of other suitable materials for the screen include plastic coated glass fibre material, the coating being e.g. of polyvinyl chloride or polytetra fluoroethylene (PTFE); rubber latex coated glass fibre material; polypropylene; and carbon fibre material.

The material of the screen may be varnished, e.g. with polyurethane varnish, to give a longer lasting surface which withstands the action of the rotary brush and also improves the releasability of the dewatered material from the screen.

The slurry is a fibrous organic slurry and may be an agricultural slurry, but other slurries may also be dewatered.

Examples of agricultural slurries include animal manure slurries, e.g. pig manure or chicken manure and examples of other slurries include sewage slurries, brewing grain slurries, paper slurries and orange pulp slurries, and slurries discharged from vegetable processing plants.

The material of the screen is, between 2 and 65 thousandths of an inch in thickness, preferably between 6 and 8 thousandths. Its mesh size is up to 3 mm, being, provided by square or round holes preferably being in excess of about 0.3 mm. square or diameter respectively.

There now follows a description to be read with reference to the accompanying drawings of apparatus embodying the invention. This description which is also illustrative of method aspects of the invention, is given by way of example of the invention only and not by way of limitation thereof.

In the accompanying drawings:

FIG. 4 shows a flow diagram of the apparatus;

FIG. 5 shows an alternative flow diagram of the apparatus;

FIG. 6 shows a diagrammatic plan view illustrating overflow ducting of the apparatus;

FIG. 7 shows a side view corresponding to FIG. 6;

FIG. 8 shows a detailed end view illustrating the overflow ducting;

FIG. 9 shows a diagrammatic side view of a grit trap of the apparatus;

FIG. 10 shows a section on the line X—X of FIG. 9;

FIG. 12 shows a diagrammatic end view of means for centralising a belt screen of the apparatus.

Figure 1:
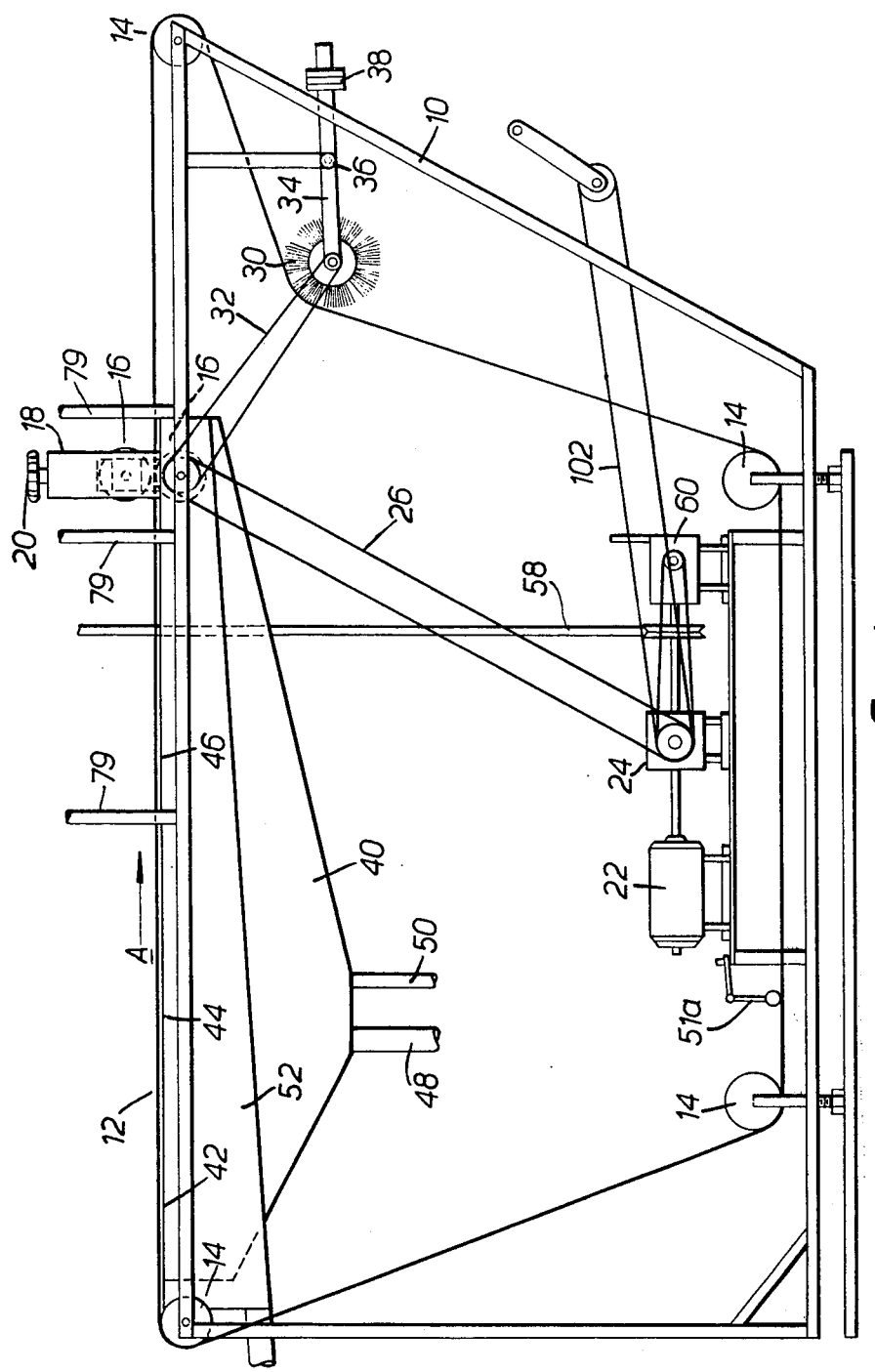
FIG. 1 shows a diagrammatic view of parts of the apparatus embodying the invention.
Figure 2:
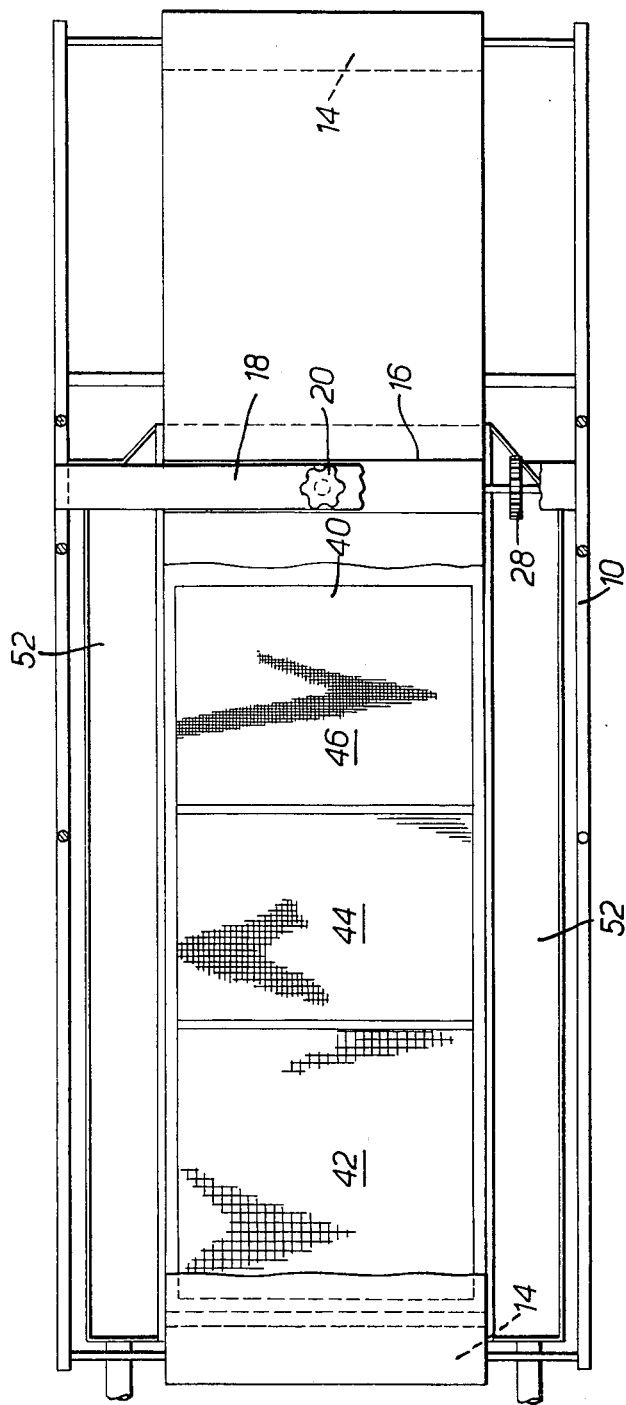
FIG. 2 shows a plan view corresponding to FIG. 1.

The apparatus embodying the invention is adapted for use in dewatering slurry and comprises (FIGS. 1, 2 and 3) a framework 10 supporting an endless belt dewatering screen 12 of thin flexible wringable inextensible textile material, e.g. terylene net or voile (Swiss Marquisette). The belt screen 12 passes round a plurality of idle rollers 14 mounted in the framework 10.

The apparatus also comprises means for applying wringable pressure to the screen 12 and slurry thereon and this means comprises a pair of opposed rubber faced pressure rollers 16 mounted in a frame 18 somewhat in the manner of a domestic "Acme" wringer. The screen 12 passes between the rollers 16 and the pressure therebetween is adjustable by a screw device 20. The pressure between the rollers 16 is between 300 and 600 lbs. per square inch, e.g. about 500 lbs. per square inch. A scraper blade (not shown) is mounted adjacent the upper roller 16 to prevent material being carried over by the roller 16.

The apparatus comprises an electric motor 22 and gear box 24 mounted in the framework 10 and arranged inter alia to drive the rollers 16 via a toothed belt drive 26 and thus cause movement of the screen 12 in the direction of the arrow A along an endless path between the rollers 16 and around the idle rollers 14. Both rollers 16 are positively driven, being geared together by meshing gears 28 (FIG. 2), only one of which is shown. The linear speed of the screen 12 is between 20 and 40 feet per minute.

Uniform pressure between the rollers 16 and the inextensible nature of the screen 12 facilitates accurate centralised linear travel of the screen 12, but means is provided (FIG. 12) for centralising the screen 12 immediately prior to its entry between the rollers 16. This means comprises a concave support trough 29 in which are mounted a plurality of idle rollers 31 over which the screen 12 moves freely to centralise itself relative to the rollers 16.

The belt screen 12 also passes in contact with a rotary nylon or fibre bristle brush 30 which is arranged to engage the screen 12 to brush dewatered solid material from the screen 12, the dewatered material being removed in a non self sustaining form. The brush 30 is rotated clockwise (FIG. 1), i.e. against the direction of movement of the screen 12 via the belt drive 26 and a further belt drive 32. The brush 30 is mounted on a lever assembly 34 which is pivotally mounted in the framework 10 at 36. The pressure of the brush 30 against the screen 12 is controlled by adjustable weights 38 mounted on the lever assembly 34.

Figure 3:
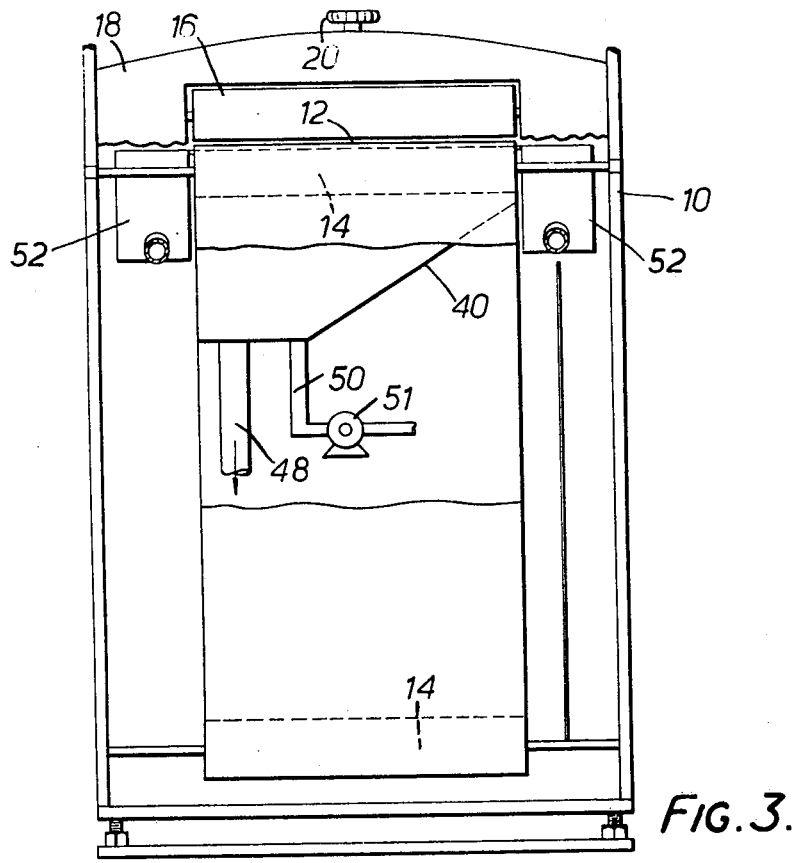
FIG. 3 shows an end view corresponding to FIG. 1.

The apparatus also comprises a water collection tray 40 comprising three stationary coplanar grids 42, 44, 46 (FIGS. 1 and 2) of plastic coated welded mesh, located below the screen 12 upstream of the rollers 16 and in contact with an underside of the screen 12. The upstream grid 42 comprises 1½ inch square mesh; the central grid 44 comprises 1 inch square mesh; and the downstream grid 46 comprises half inch square mesh. Drawing the screen 12 across the grids 42, 44, 46 apparently assists the dewatering action by a surface tension effect. Two outlets 48, 50 (FIGS. 1 and 3) lead from the collection tray 40, the outlet 50 leading to a small pump 51, (FIG. 3).

Overflow ducting 52 extends along either side of the screen 12 adjacent to the collection tray 40.

In the operation of the apparatus slurry is fed onto the screen 12 upstream of the rollers 16. Some water passes through the screen 12 into the collection tray 40 by gravity prior to the rollers 16; at the rollers 16 a sludge comprising the finer solids is pressed out by the rollers 16. The coarser solids pass with the screen 12 through the rollers 16 to the brush 30 which removes the solids from the screen 12. If desired, chemical additives can be added to the solids on the screen 12 following the rollers 16 and are intermixed by the action of the brush 30.

The apparatus also comprises a safety switch device 51a, arranged to operate in response to the tension in the belt screen 12; should the screen 12 break or otherwise lose tension, the switch device 51 breaks contact and stops the operation of the motor 22.

FIG. 4 shows one flow diagram of the apparatus, in which slurry to be dewatered is retained in a holding tank 54 into which extends an aerator 55 and a screw pump 56 both of known type. The pump 56 is driven from the gear box 24 via a belt drive 58 (FIG. 1) and air is supplied to the aerator 55 by a compressor 60 mounted in the framework 10 and also driven from the gear box 24. Slurry is fed from the tank 54 by the pump 56 via a line 62 and a grit trap 64 to the screen 12.

Liquid from the tray 40 passes via the outlet 48 to a disposal locality which is for example a sewer for subsequent treatment, a storage tank, an aeration chamber or a settlement lagoon; the liquid for disposal may also be conveyed by small bore pipes for direct application to growing crops. Liquid from the tray 40 also passes via the outlet 50 and the pump 51 to a foam control spray arrangement 66 arranged above the holding tank 54.

Solids removed by the brush 30 pass to a heap 68 or a bagging device (not shown).

It will be realised that the actual direction of feed of slurry to the screen 22 may be varied both in the vertical plane and in the horizontal plane and similarly the direction of solids output.

The aeration of the slurry in the holding tank 54 prior to dewatering assists the dewatering, and it will be realised that during the dewatering the slurry is under aerobic conditions and it is found that the solids discharged from the apparatus are relatively odourless.

FIG. 5 shows an alternative flow diagram which is similar in many respects to that shown in FIG. 4 and is described in so far as it differs therefrom. The flow diagram of FIG. 5 incorporates a liquid level probe 70 to guard against the liquid level in the holding tank 54 falling below the appropriate minimum level for the pump 56; when the level probe 70 senses the appropriate low level, it causes via a control valve arrangement 71 for total recycle of liquid from the outlet 48 back to the holding tank 54 via a line 72.

The arrangement of overflow ducting 52 is shown in more detail in FIGS. 6, 7 and 8. A ducting outlet pipe 74 leads to the holding tank 54.

The ducting 52 comprises plastic trunking with a lip 76 (FIG. 8) extending over the screen 12 on either side thereof. A lip 78 on the collection tray 40 extends under the screen 12 and slightly overlaps the lip 76.

It will be realised that excess slurry readily runs from the screen 12 over the lip 76 into the ducting 52, a seal against leakage being provided at the lips 76, 78.

The grit trap 64 is shown in more detail in FIGS. 9 and 10. It is supported above the screen 12 by support members 79 (FIG. 1) of the framework 10.

The trap 64 comprises a slurry inlet hopper 80 with an inclined grid 82 to deflect larger objects downwardly through an opening 82a in the hopper. The inlet hopper 80 leads to an inverted L-shaped chamber 83. The trap 64 also comprises a wire container 82b with a handle (not shown), and overlapping baffles 84. The wire container is removable upwardly out of the chamber 83, the grid 82 being hinged to permit this. Solid objects passing the grid 82 fall into the container 82b which is emptied at convenient intervals.

In a modification, the wire container 82b is replaced by a shallow imperforate metal container which extends no higher than the lower end of the lower baffles 84; this box would still effectively collect stones and the like but would permit straws and the like to continue through the trap 64 to the screen 12.

A drain plug 86 is provided and also a grid 85 to protect the screen 12 and other parts of the apparatus from solid objects falling from the grid 82 via the opening 82a.

A slurry feed chute 88 open at the top leads from an upper part of the chamber 83 to feed slurry onto the screen 12. The feed chute 88 is inclined downwardly in a direction away from the rollers 16. The feed chute 88 has a fluted cross section as shown in FIG. 10 for even distribution of the slurry. Also, an overflow 90 is provided which leads back to the holding tank 54.

Figure 11:
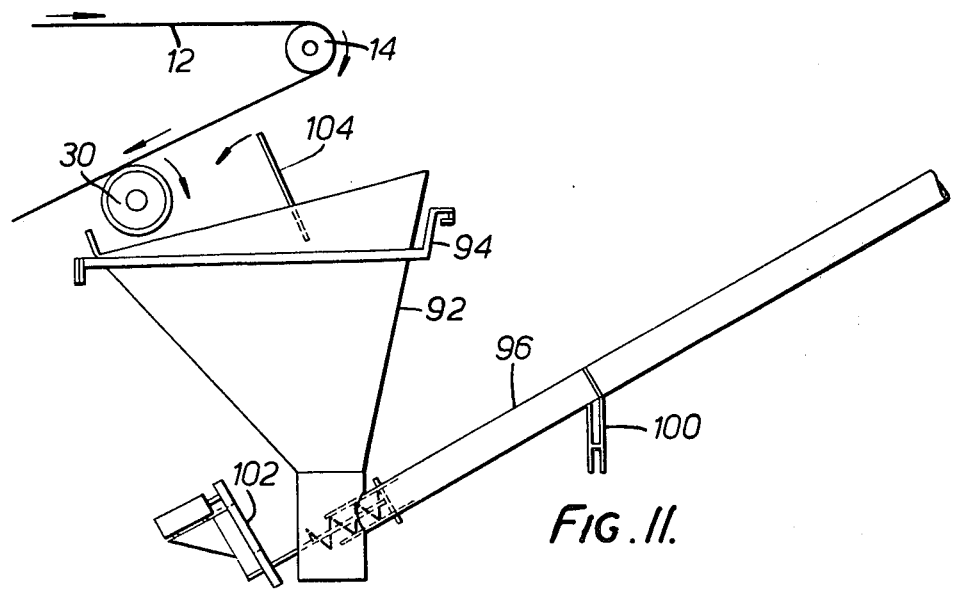
FIG. 11 shows a diagrammatic side view of solid discharge means of the apparatus.

The brush 30 (FIG. 11) discharges into a hopper 92 supported by a framework 94. An Archimidean screw elevator 96 leads upwardly from the hopper 92 to the heap 68 (FIG. 4) or the bagging device (not shown). The elevator 96 is supported by legs 100. The elevator 96 is driven by a belt drive 102 (FIGS. 1 and 11) from the gear box 24. An adjustable baffle plate 104 is provided to prevent build up on the sides of the hopper 92.

Alternatively the hopper 92 is omitted and the brush 30 discharges directly onto an Archimidean screw conveyor arranged horizontally in line with the brush 30. The conveyor has a short length of imperforate troughing adjacent the brush 30 followed by a wide open slot in its base through which the material falls until it builds up to the level of the slot; this closes the slot locally and material is then discharged through the slot downstream of the closed portion of the slot and so on.

It has been found that using the apparatus slurries can be dewatered to a dry matter content of about 30% by weight.

In a modification of the apparatus, two belt screens are provided, one above the other, the finer mesh screen being provided below the coarser mesh screen for successive dewatering operations.

Also it will be appreciated that instead of all drives being provided from the gear box 24 separate drives may be provided for one or more of the various parts of the apparatus requiring to be driven.

I believe that the thinness of the screen eliminates any substantial intra cellular entrapment of moisture thereby.

I claim:

1. Apparatus for dewatering a fibrous organic slurry comprising (a) a moving dewatering screen of flexible inextensible material unsupported by a corresponding carrier which moves with the material, said material being between about 2 and about 65 thousandths of an inch in thickness and of a mesh size up to about 3 mm, (b) opposed rollers between which the screen passes, (c) means for applying via the rollers a wringing pressure between about 300 and about 600 psi to the screen and slurry thereon, and (d) means for driving the rollers to move the screen past the rollers solely by pinch action of the rollers at a speed between about 20 and about 40 feet per minute.

2. Apparatus according to claim 1 further comprising means for removing dewatered material from the screen.

3. Apparatus according to claim 2, wherein the removing means comprises a rotary brush engageable with the screen.

4. Apparatus according to claim 1, wherein the screen comprises an endless belt and the driving means moves the screen along an endless path extending past the rollers.

5. Apparatus according to claim 1, further comprising means for accurately centralising the screen relative to the rollers.

6. Apparatus according to claim 1, further comprising means for aerating the slurry prior to its entry onto the screen.

7. Apparatus according to claim 1, wherein the material of the screen is selected from the group consisting of textile material, metallic material, and plastic coated glass fibre material.

8. Apparatus according to claim 1, wherein the material of the screen is selected from the group consisting of terylene (dacron), polypropylene, and glass fibre material coated with polyvinyl chloride.

9. Apparatus according to claim 1, wherein the material of the screen is between about 6 and about 8 thousandths of an inch in thickness.

10. Apparatus according to claim 1, wherein the material of the screen has a mesh size between about 0.3 and about 3 mm.

11. A method of dewatering a fibrous organic slurry comprising the steps of (a) feeding slurry to be dewatered onto a flexible inextensible screen unsupported by a corresponding carrier which moves with the screen, said screen being between about 2 and about 65 thousandths of an inch in thickness and of a mesh size up to about 3 mm, (b) engaging the screen between opposed rollers, (c) applying via the rollers a wringing pressure between about 300 and 600 psi to the screen and slurry thereon, and (d) driving the rollers to move the screen solely by pinch action of the rollers and at a speed between about 20 and 40 feet per minute.

12. A method according to claim 11, wherein the slurry is an effluent slurry.

13. A method according to claim 11, wherein the slurry is agricultural.

14. A method according to claim 11, wherein the slurry comprises animal manure.

15. A method according to claim 11, wherein the slurry is selected from the group consisting of pig manure and chicken manure.

16. A method according to claim 11, wherein the slurry is dewatered to a dry matter content of about 30% by weight.

17. A method according to claim 11, wherein the material of the screen has a mesh size between about 0.3 and about 3 mm.

18. A method according to claim 11, wherein the screen passes between only a single pair of opposed rollers.

19. Apparatus for dewatering a fibrous organic slurry comprising (a) a moving screen of flexible inextensible material unsupported by a corresponding carrier which moves with the material, said material being between about 2 and 65 thousandths of an inch in thickness and of a mesh size between about 0.3 and about 3 mm., (b) a single pair of opposed rollers between which the screen passes, (c) means for applying via the rollers a wringing pressure between about 300 and about 600 psi to the screen and slurry thereon, and (d) means for driving the rollers to move the screen past the rollers solely by pinch action of the rollers at a speed between about 20 and about 40 feet per minute.

20. Apparatus according to claim 19, comprising means for gearing the rollers together so that both rollers are positively driven at the same peripheral speed.

21. Apparatus according to claim 19, comprising means for adjusting the pressure between the rollers.

22. Apparatus according to claim 19, wherein both the opposed rollers are faced with resilient material between which the screen passes.

* * * * *